(12) United States Patent
Whitehurst et al.

(10) Patent No.: US 9,828,864 B2
(45) Date of Patent: Nov. 28, 2017

(54) FAN BLADE TALL DOVETAIL FOR INDIVIDUALLY BLADED ROTORS

(71) Applicants: United Technologies Corporation, Hartford, CT (US); Sean A. Whitehurst, South Windsor, CT (US); Patrick James McComb, Naugatuck, CT (US); Lee Drozdenko, Bristol, CT (US)

(72) Inventors: Sean A. Whitehurst, South Windsor, CT (US); Patrick James McComb, Naugatuck, CT (US); Lee Drozdenko, Bristol, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 267 days.

(21) Appl. No.: 14/429,029

(22) PCT Filed: Mar. 15, 2013

(86) PCT No.: PCT/US2013/031868
§ 371 (c)(1),
(2) Date: Mar. 18, 2015

(87) PCT Pub. No.: WO2014/046735
PCT Pub. Date: Mar. 27, 2014

(65) Prior Publication Data
US 2015/0233259 A1    Aug. 20, 2015

Related U.S. Application Data

(60) Provisional application No. 61/703,498, filed on Sep. 20, 2012.

(51) Int. Cl.
F01D 5/30 (2006.01)
F02C 3/04 (2006.01)
F01D 5/28 (2006.01)

(52) U.S. Cl.
CPC .............. *F01D 5/303* (2013.01); *F01D 5/28* (2013.01); *F02C 3/04* (2013.01)

(58) Field of Classification Search
CPC .......... F01D 5/303; F01D 5/28; F01D 5/3007; F02C 3/04
(Continued)

(56) References Cited

U.S. PATENT DOCUMENTS 4,767,274 A    8/1988  Walter
5,501,575 A    3/1996  Eldredge et al.
(Continued)

FOREIGN PATENT DOCUMENTS

WO    2014014539    1/2014
WO    2014100203    6/2014
WO    2014158447    10/2014

OTHER PUBLICATIONS

European Search Report for European Application No. 13838329.4 dated Nov. 3, 2015.
(Continued)

*Primary Examiner* — Craig Kim
*Assistant Examiner* — Michael Sehn
(74) *Attorney, Agent, or Firm* — Carlson, Gaskey & Olds, P.C.

(57) ABSTRACT

A blade has an airfoil extending radially outwardly of a dovetail. The dovetail has edges that will be at circumferential sides of the blade when the blade is mounted within a rotor. A bottom surface of the dovetail will be radially inward when the rotor blade is mounted in a rotor, and is formed such that a circumferentially central portion of the
(Continued)

bottom surface is radially thicker than are circumferential edges. A fan and a gas turbine engine are also described.

12 Claims, 3 Drawing Sheets

(58) Field of Classification Search
USPC ..................................................... 416/219 R
See application file for complete search history.

(56) References Cited

U.S. PATENT DOCUMENTS

| | | | |
|---|---|---|---|
| 5,522,702 A | 6/1996 | Kemsley et al. | |
| 6,033,185 A | 3/2000 | Lammas et al. | |
| 6,652,237 B2 * | 11/2003 | Yehle | F01D 5/3046 416/219 R |
| 7,153,103 B2 | 12/2006 | Farndon | |
| 7,661,931 B1 | 2/2010 | Matheny | |
| 2003/0002987 A1 | 1/2003 | Davidson | |
| 2004/0076523 A1 | 4/2004 | Sinha et al. | |
| 2005/0180852 A1 | 8/2005 | Goldfinch | |
| 2009/0129932 A1 | 5/2009 | Riaz et al. | |
| 2010/0034659 A1 | 2/2010 | Fujimura | |
| 2010/0105516 A1 * | 4/2010 | Sheridan | F01D 25/18 475/346 |
| 2011/0129348 A1 | 6/2011 | Parkin et al. | |
| 2011/0223027 A1 | 9/2011 | Klinetob et al. | |
| 2011/0293429 A1 | 12/2011 | Barnett et al. | |
| 2012/0082551 A1 | 4/2012 | Macchia et al. | |

OTHER PUBLICATIONS

International Preliminary Report on Patentability for International Application No. PCT/US2013/031868 dated Apr. 2, 2015.
U.S. Appl. No. 13/459,748, filed Apr. 30, 2012.
International Search Report & Written Opinion for PCT/US2013/031868 dated Dec. 12, 2013.

* cited by examiner

FAN BLADE TALL DOVETAIL FOR INDIVIDUALLY BLADED ROTORS

This application is a United States National Phase of PCT Application No. PCT/US2013/031868 filed on Mar. 15, 2013 which claims priority to U.S. Provisional Application Ser. No. 61/703,498, filed on Sep. 20, 2012.

BACKGROUND

This disclosure relates to dovetail geometry for fan blades used in individually bladed rotors of gas turbine engines.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Individual fan blades are mounted within a hub or rotor driven by the gear assembly. The configuration and geometry of the fan blades balance propulsive efficiency with durability and fatigue requirements.

A dovetail of each fan blade is received in a correspondingly shaped slot in the fan rotor. The dovetail provides a bearing surface which reacts against a load surface of the slot. It is desirable to provide a small dovetail for weight savings. However, the dovetail is sized to provide sufficient strength to retain the fan blades in the fan rotor throughout engine operation and during a variety of conditions. Several prior art dovetails have provided a ratio of neck width to a vertical bearing surface height of 1.19, 1.35 and 1.49. A prior art ratio of fan radius to vertical bearing surface height of 45, 47 and 56 has been provided, and a prior art ratio of dovetail width to vertical bearing surface height of 2.31, 2.93 and 2.99 has been provided.

Although geared architecture have improved propulsive efficiency, turbine engine manufacturers continue to seek further improvements to engine performance including improvements to thermal, transfer and propulsive efficiencies.

SUMMARY

In one exemplary embodiment, a fan blade for a gas turbine engine includes an airfoil that defines a pressure and suction side. A neck supports the airfoil and interconnects to a dovetail by opposing radii. The dovetail includes a bearing surface tangent to one of the radii at a tangent point. The dovetail has a dovetail width and a vertical bearing surface height from the tangent point to a bottom of the dovetail opposite the neck. A first ratio of the dovetail width to the vertical bearing surface height is in a range of substantially between 2.32 to 2.90.

In a further embodiment of the above, the first ratio is in a range of 2.35 to 2.70.

In a further embodiment of any of the above, the first ratio is about 2.40.

In a further embodiment of any of the above, the neck includes a neck width. A second ratio of the neck width to the vertical bearing surface height is in a range of 0.95 to 1.18.

In a further embodiment of any of the above, the second ratio is in a range of about 1.10.

In a further embodiment of any of the above, the vertical bearing height is in the range of 0.675 inch to 0.775 inch.

In another exemplary embodiment, a fan section of a gas turbine engine includes a fan rotor that has a slot and a load surface. An airfoil defines a pressure and suction side. A neck supports the airfoil and interconnects to a dovetail by opposing radii. The dovetail is received in the slot. The dovetail includes a bearing surface tangent to one of the radii at a tangent point. The dovetail has a dovetail width and a vertical bearing surface height from the tangent point to a bottom of the dovetail opposite the neck. The first ratio of the dovetail width to the vertical bearing surface height is in a range of substantially between 2.32 to 2.90.

In a further embodiment of any of the above, the bearing surface is configured to react against the load surface during engine operation. A spacer is provided between the bottom and the slot.

In a further embodiment of any of the above, the neck includes a neck width. A second ratio of the neck width to the vertical bearing surface height is in a range of 0.95 to 1.18.

In a further embodiment of any of the above, a fan section of a gas turbine engine includes a fan radius. A third ratio of the fan radius to the vertical bearing surface height is in a range of 30 to 44.

In a further embodiment of any of the above, the third ratio is about 39.

In a further embodiment of any of the above, the vertical bearing height is in the range of 0.675 inch to 0.775 inch.

In one exemplary embodiment, a gas turbine engine includes a fan section that has a plurality of fan blades that are mounted to a fan rotor that is rotatable about an axis. A gas turbine engine also includes a compressor section and a combustor that are in fluid communication with one another. A turbine section is in fluid communication with the combustor. A fan drive gear system module is coupled to the turbine section for rotating the fan about the axis. A neck supports the fan blades and is interconnected to a dovetail by opposing radii. The dovetail is received by the fan rotor. The dovetail includes a bearing surface tangent to one of the radii at a tangent point. The dovetail has a dovetail width and a vertical bearing surface height from the tangent point to a bottom of the dovetail opposite the neck. A first ratio of the dovetail width to the vertical bearing surface height is in a range of substantially between 2.32 to 2.90.

In a further embodiment of any of the above, the neck includes a neck width. A second ratio of the neck width to the vertical bearing surface height is in a range of 1.18 to 0.95.

In a further embodiment of any of the above, a gas turbine engine includes a fan radius. A third ratio of the fan radius to the vertical bearing surface height is in a range of 30 to 44.

BRIEF DESCRIPTION OF THE DRAWINGS

The disclosure can be further understood by reference to the following detailed description when considered in connection with the accompanying drawings wherein.

DETAILED DESCRIPTION

Figure 1:
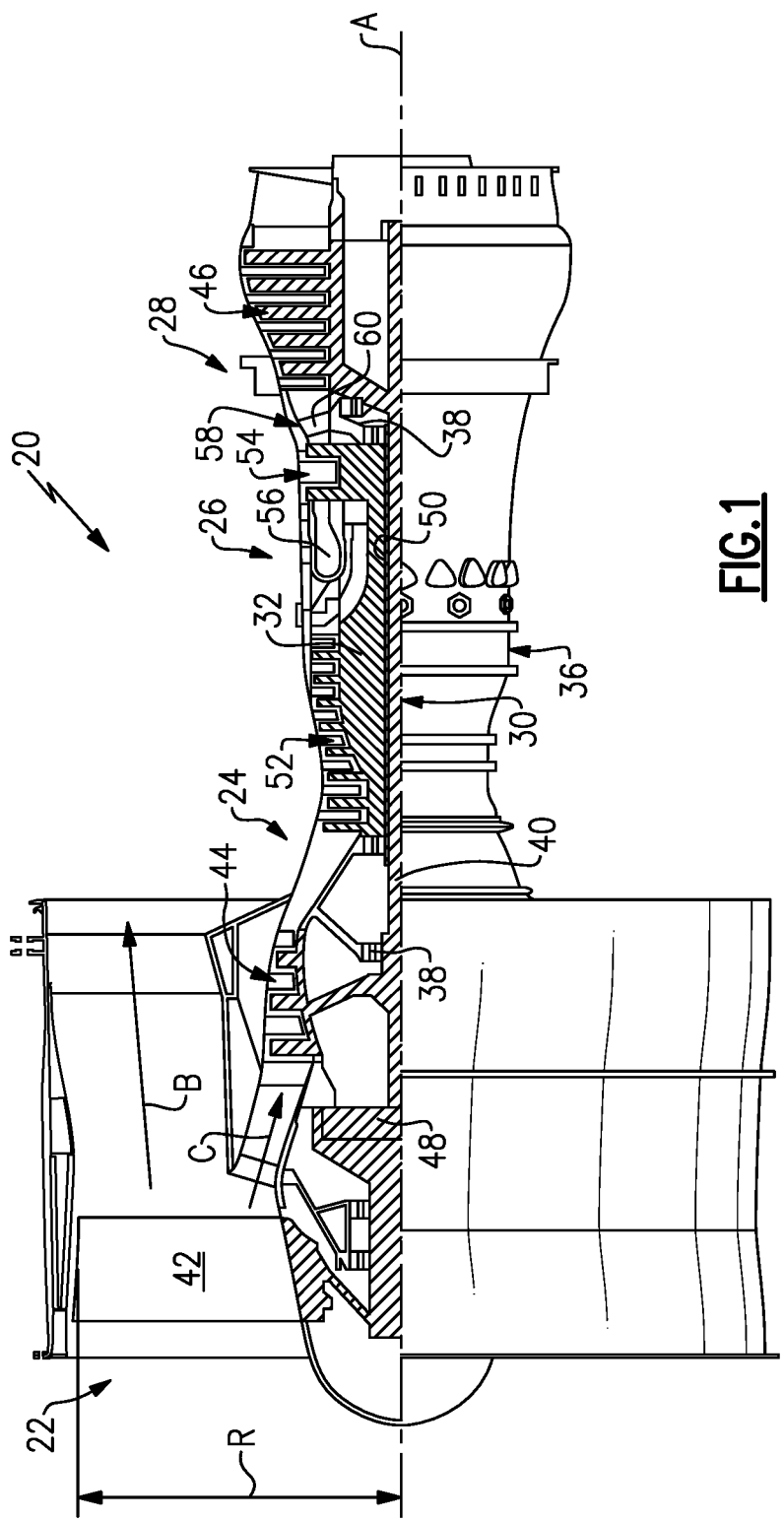
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\,°\,R)/(518.7°\,R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2A:
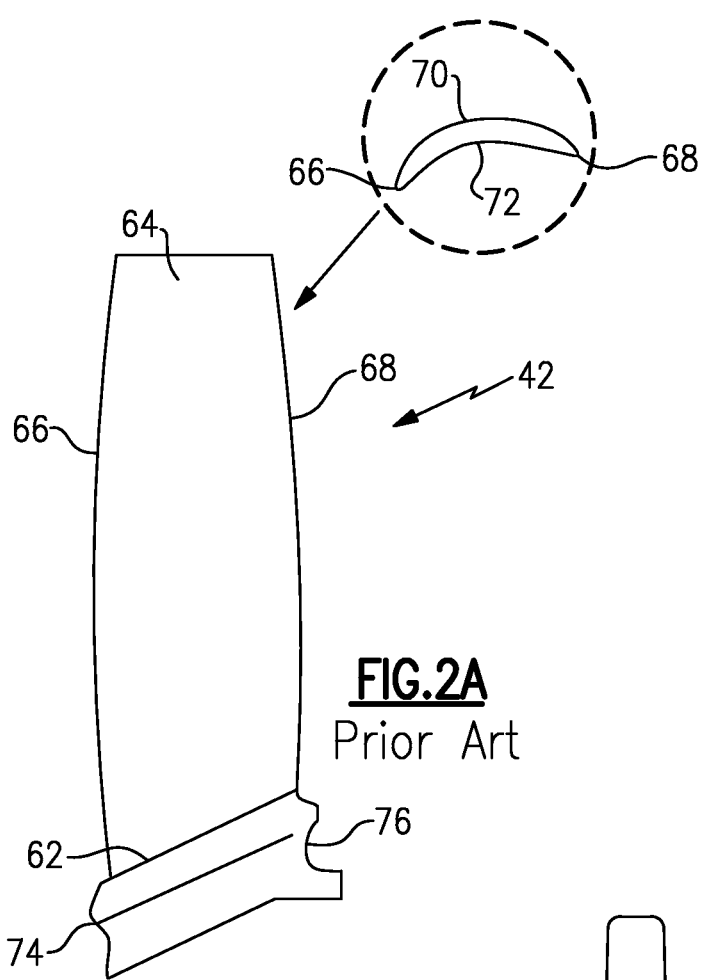
FIG. 2A is a schematic view of an example prior art fan blade.

A fan blade 42 is illustrated in FIG. 2A having an airfoil 64 extending radially outwardly from a dovetail 62. A leading edge 66 and a trailing edge 68 define the forward and rear limits of the airfoil 64. The airfoil 64 has a suction side 70 and a pressure side 72. The dovetail 62 includes ends 74 and 76 that are found at ends of the overall blade 42 associated with the leading edge 66 and trailing edge 68.

Figure 2B:
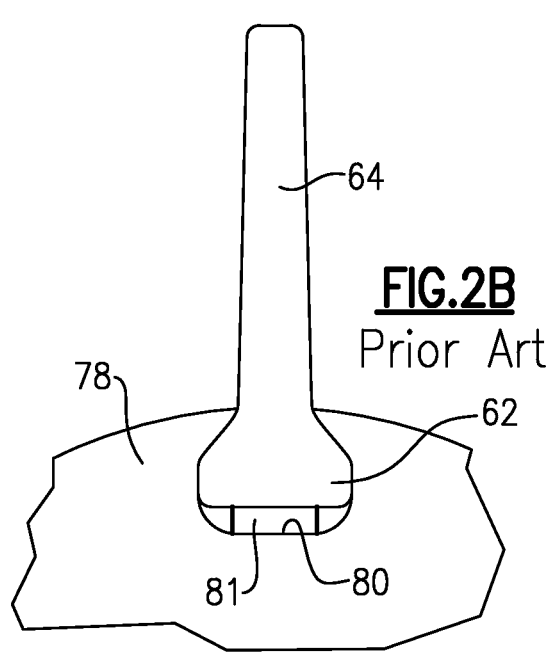
FIG. 2B is an end view of the fan blade shown in FIG. 2A received in a fan rotor.

As shown in FIG. 2B, a fan rotor 78 receives the dovetail 62 in slot 80, shown schematically, to mount the fan blade 42 with the airfoil 64 extending radially outwardly. A spacer 81 is provided within the slot 80 between the fan rotor 78 and the dovetail 62. The rotor 78 carries the fan blade 42 as the rotor is rotationally driven.

An aluminum hybrid metallic hollow fan blade includes dovetails to secure the blade into the disk or rotor 78. It is desired to minimize stress for low cycle and high cycle fatigue in addition to improve impact capability under bird strike and fan blade out loads. The disclosed tall dovetail and its desired ratios (FIG. 3) provide more stiffness and stress reduction than a typical dovetail design (FIG. 2). The disclosed dovetail proposal reduces stresses and maximizes stiffness for aluminum and applies to any hybrid metallic or singular metallic fan blade (aluminum, titanium, etc.).

The disclosed dovetail design geometry proposes to minimize stress in the dovetail 84 and reduce weight in the heavier (since material is denser) disk or rotor 78. The current dovetail design has a short depth, or vertical bearing surface height 82, as shown in FIG. 3.

Figure 3:
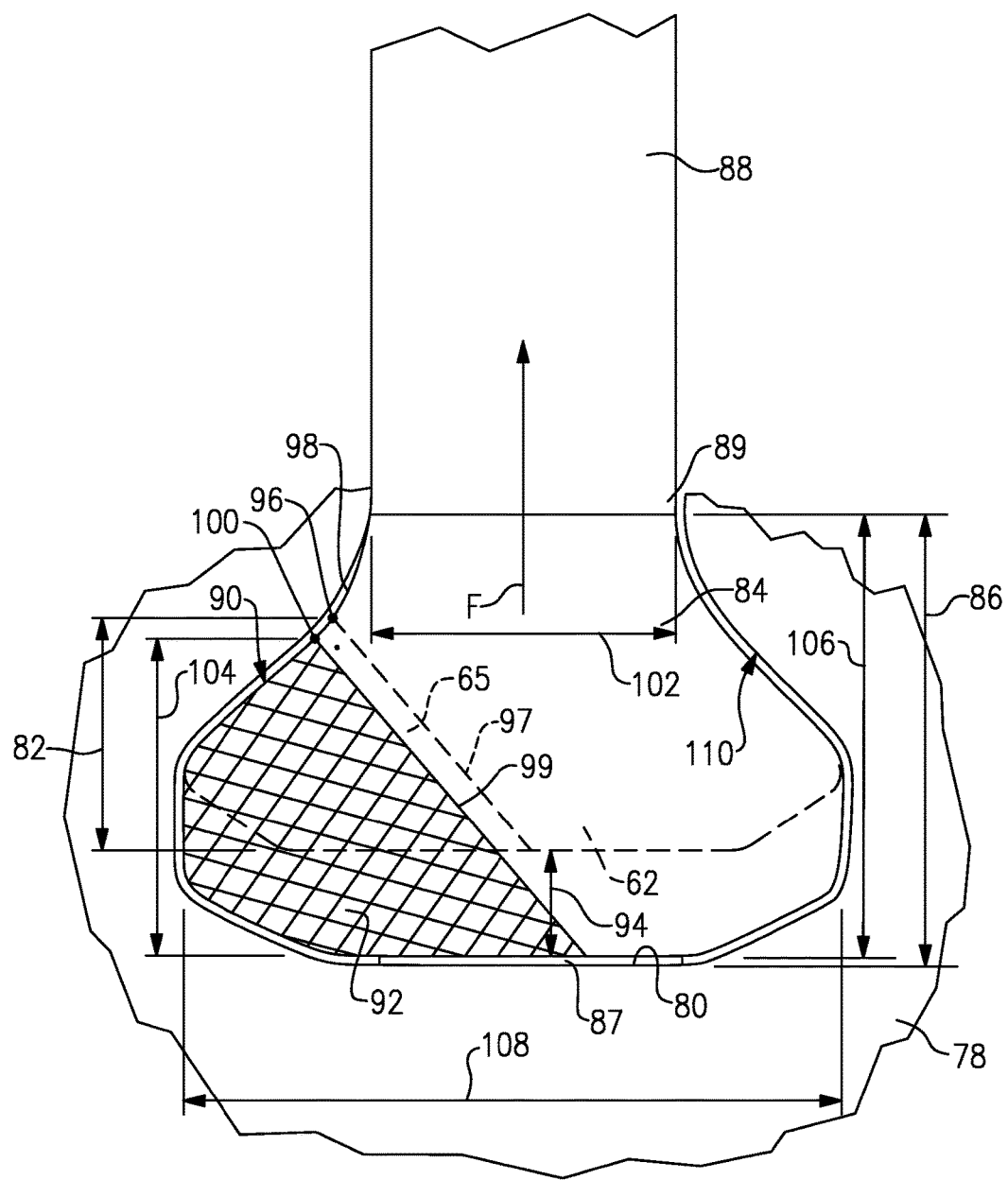
FIG. 3 is a schematic end view of an example fan blade dovetail according to the disclosure.

Referring to FIG. 3, the slot 80 has a radial slot height 86. A neck 89 supports the airfoil 88 interconnected to the dovetail 84 by opposing radii 98. The dovetail 84 includes a bearing surface 90 that is configured to react against a load surface 110 of the slot 80 during engine operation. The prior art dovetail 62 includes a stress area 65 provided by a plane 97 that is normal to a tangent point 96 of the bearing surface 90 to the radius 98. The stress area 92 of the example dovetail 94 is provided by a plane 99 that is normal to a tangent point 100 of the bearing surface 90 to the radius 98. As can be appreciated from FIG. 3, the stress area 92 is significantly larger than the stress area 97. Since the dovetail 84 is larger than the prior art dovetail 62, a smaller spacer 87 is used between a bottom of the dovetail 84 and the slot 84 for the same size slot.

The prior art stress area 65 has a vertical bearing surface height 82 from the tangent point 96 to the bottom of the dovetail 62. The vertical bearing surface height 104 from the tangent point 100 to the bottom of the dovetail 84 is significantly larger. The dovetail width 108 is the same between the prior art dovetail 62 and the disclosed dovetail 84 for the same size slot.

The dovetail 84 has a first ratio of the dovetail width 108 to the vertical bearing surface height 104 in the range of 2.32 to 2.90. In one example, the first ratio is in a range of 2.35 to 2.70. In another example, the first ratio is about 2.40, or 2.40+/−0.05.

The neck 89 includes a neck width 102. A second ratio of the neck width 102 to the vertical bearing surface height 104 is in the range of 0.95 to 1.18. In another example, the second ratio is in a range of about 1.10, or 1.10+/−0.05. The vertical bearing height is in the range of 0.675 in (17.15 mm) to 0.775 in (19.69 mm).

The engine 20 has a fan radius R, as shown in FIG. 1. A third ratio of the fan radius to the vertical bearing surface height 104 is in the range of 30 to 44. In one example, the third ratio is about 39, or 39+/−5.

The tall dovetail 84 increases stiffness and increases the life of the part by decreasing stresses. The tall dovetail 84 could also be made shorter in the radial direction with an optimized increase in radial height resulting in less system weight. The bearing surface 90 experiences high stress levels due to tooth bending of the dovetail 84. Reducing tooth bending provides a longer life part as well as reduced system weight. The disclosed dovetail includes an increased shear area 92 that reduces shear strains during fan blade loss.

The disclosed shear area 92 is greater than a shear area 65 of a prior dovetail 62. In one disclosed example, the shear area 92 is between about 20% to 30% greater than the shear area 65 of prior dovetail 62. In another disclosed example, the shear area is approximately 25% greater than previous dovetails represented by the prior art dovetail 62. The shear area 92 is related to the increased radial height 106. In one non-limiting dimensional embodiment, the height is between 0.95 inches and 1.20 inches. Moreover, in another non-limiting dimensional embodiment the height is increased between 0.1 inches and 0.2 inches.

This invention allows the dovetail to provide maximized blade stiffness and reduces system weight since are a lighter weight blade material is replaced with heaver disk material. The increased thickness in the tall dovetail 84 provides additional area for fan blade loss. This is a benefit on an aluminum hybrid metallic hollow blades and it applicable to other materials.

The disclosed fan blade tall dovetail 84 provides a radially tall dovetail that result in lower strains during a bird/blade impact and a fan blade out situations. This results in no or reduced blade material being liberated. The fan blade is a low cycle fatigue part. The limiting location is on the bearing surface, which experiences high stress levels due to tooth bending in the dovetail. Eliminating this tooth bending provides for a longer lasting part as well as a reduced weight part. Prior art dovetail fillet run out has the potential to fail in shear during a fan blade out event. The extra shear area provided by the disclosed tall dovetail 84 increases capability by reducing shear stresses during such an event. In one example the disclosed tall dovetail 84 includes a reduction in stress of between 10% and 30% over previous dovetail configurations. In another disclosed embodiment, the reduction in stress is between about 12% and 26%.

Although an example embodiment has been disclosed, a worker of ordinary skill in this art would recognize that certain modifications would come within the scope of this disclosure.

The invention claimed is:

1. A fan blade for a gas turbine engine comprising:
an airfoil defining a pressure and suction side; and
a neck supporting the airfoil and interconnected to a dovetail by opposing radii, the dovetail including a bearing surface tangent to one of the radii at a tangent point, wherein the dovetail has a dovetail width and a vertical bearing surface height from the tangent point to a bottom of the dovetail opposite the neck, and a first ratio of the dovetail width to the vertical bearing surface height is in a range of substantially between 2.32 and 2.90, wherein the neck includes a neck width, and a second ratio of the neck width to the vertical bearing surface height is in a range of 0.95 to 1.18.

2. The fan blade according to claim 1, wherein the first ratio is in a range of 2.35 to 2.70.

3. The fan blade according to claim 2, wherein the first ratio is about 2.40.

4. The fan blade according to claim 1, wherein the second ratio is in a range of about 1.10.

5. The fan blade according to claim 1, wherein the vertical bearing height is in the range of 0.675 inch to 0.775 inch.

6. A fan section of a gas turbine engine comprising:
a fan rotor including a slot having a load surface;
an airfoil defining a pressure and suction side; and
a neck supporting the airfoil and interconnected to a dovetail by opposing radii, the dovetail received in the slot, the dovetail including a bearing surface tangent to one of the radii at a tangent point, wherein the dovetail has a dovetail width and a vertical bearing surface height from the tangent point to a bottom of the dovetail opposite the neck, and a first ratio of the dovetail width to the vertical bearing surface height is in a range of substantially between 2.32 to 2.90, wherein the neck includes a neck width, and a second ratio of the neck width to the vertical bearing surface height is in a range of 0.95 to 1.18.

7. The fan section according to claim 6, wherein the bearing surface is configured to react against the load surface during engine operation, and a spacer provided between the bottom and the slot.

8. The fan section according to claim 6, comprising a fan radius, and a third ratio of the fan radius to the vertical bearing surface height is in a range of 30 to 44.

9. The fan section according to claim 8, wherein the third ratio is about 39.

10. The fan section according to claim 6, wherein the vertical bearing height is in the range of 0.675 inch to 0.775 inch.

11. A gas turbine engine comprising:
a fan section including a plurality of fan blades mounted to a fan rotor that is rotatable about an axis;
a compressor section;
a combustor in fluid communication with the compressor section;
a turbine section in fluid communication with the combustor;
a fan drive gear system module coupled to the turbine section for rotating the fan about the axis; and
wherein a neck supports the fan blades and is interconnected to a dovetail by opposing radii, the dovetail received by the fan rotor, the dovetail including a bearing surface tangent to one of the radii at a tangent point, wherein the dovetail has a dovetail width and a vertical bearing surface height from the tangent point to a bottom of the dovetail opposite the neck, and a first ratio of the dovetail width to the vertical bearing surface height is in a range of substantially between 2.32 to 2.90, wherein the neck includes a neck width, and a second ratio of the neck width to the vertical bearing surface height is in a range of 0.95 to 1.18.

12. The gas turbine engine according to claim 11, comprising a fan radius, and a third ratio of the fan radius to the vertical bearing surface height is in a range of 30 to 44.

* * * * *